Figure 1:
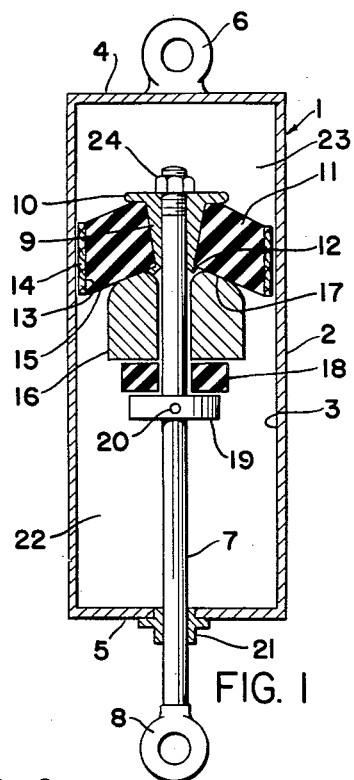

June 26, 1956

R. FORCELLINI 2,752,149

SHOCK ABSORBER FOR MOTOR VEHICLES WITH
SELF REGULATING SLIDING FRICTION

Filed Oct. 2, 1950

3 Sheets-Sheet 1

INVENTOR.
RENZO FORCELLINI
BY
*Elyr Frye*
ATTORNEYS

INVENTOR.
RENZO FORCELLINI
BY
*Elyo Frye*
ATTORNEYS

June 26, 1956 R. FORCELLINI 2,752,149
SHOCK ABSORBER FOR MOTOR VEHICLES WITH
SELF REGULATING SLIDING FRICTION
Filed Oct. 2, 1950 3 Sheets-Sheet 3

INVENTOR.
RENZO FORCELLINI
BY Ely V Frye
ATTORNEYS

United States Patent Office 2,752,149
Patented June 26, 1956

2,752,149

SHOCK ABSORBER FOR MOTOR VEHICLES WITH SELF REGULATING SLIDING FRICTION

Renzo Forcellini, Milan, Italy, assignor to Società Applicazioni Gomma Antivibranti S. A. G. A. Società per Azioni, Milan, Italy, a corporation Application October 2, 1950, Serial No. 188,005

Claims priority, application Italy October 7, 1949

19 Claims. (Cl. 267—9)

This invention relates to improvements in shock absorbers for motor vehicles and the like, wherein sliding friction forces are utilized to obtain a shock absorbing or braking action.

In previous shock absorbers employing sliding friction, a friction force of constant value was developed which frequently resulted in inefficient suspension when the vehicle was at rest.

One of the objects of the present invention is to provide a shock absorber employing sliding friction forces, which is simple in construction, and which overcomes the inefficiencies of prior constructions by providing for self regulation of the friction forces utilized.

Another object is to provide a shock absorber of the character referred to wherein the friction forces employed in absorbing shock may be varied in a predetermined manner and will disappear completely when the vehicle is at rest.

A further object is to provide a shock absorber of the character referred to comprising a kinematic coupling, the two principal members of which have relative movement which is interrupted by the expansion or deformation of a deformable elastic element into engagement with one of the members, bringing sliding friction forces into play, which forces may be varied in a predetermined manner by utilizing specific means to be referred to, or by specific formation of the elastic element, or by both, suitably combined.

More particularly the variation of the sliding friction forces or the braking action is determined by the pressure of the deformable elastic element against one of the two principal members of the kinematic coupling, which pressure may be varied by any suitable means which will deform the elastic element. For example, such means could comprise an inert mass or member connected to the movable member of the kinematic coupling so as to be slidable on the latter member, which mass, upon each acceleration of the coupling acts to deform the elastic element, thus varying the pressure of the latter against the fixed member of the coupling; or such means could comprise a fluid acting against one surface of the deformable elastic member; or springs or other analogous mechanical means acting directly on the deformable elastic element, or by shaping the deformable elastic element so that the stopping action per se of this element could be utilized; or by suitable combinations of the foregoing specified means.

In this manner the shock absorbing or braking action of the shock absorber can be determined and fixed in advance within wide limits and then adapted for use under various conditions. In effect, the action of the inert mass or member on the deformable elastic element is proportional to the acceleration of the coupling; the action of the fluid is proportional to the speed as well as to the displacement; and the action of springs or other analogous mechanical means, as well as the stopping action, depend upon displacement. As a consequence, the friction force may become sometimes a function of acceleration, sometimes of speed and sometimes of displacement. Furthermore, the variations of each of these actions may be readily taken into consideration during construction of the device. For example, where the friction force is a function of acceleration, it is sufficient to vary the size or weight of the inert mass or member; where it is a function of speed, it is sufficient to vary the size of the discharge openings for the fluid; and where it is a function of displacement, one might vary the absolute volumes of the chambers in which the fluid is acting, or the characteristics of the springs or, for the stopping action, the shape and yielding ability of the elastic element.

Thus, a shock absorber is provided which will work efficiently with any type of vehicle and particularly for any area of vibration, as well as one which may be regulated and adapted to substantially all driving conditions (speed of the vehicle, condition of the road, etc.), which features cannot be obtained with conventional shock absorbers employing sliding friction, wherein the reaction is proportional only to displacement, nor with those having only fluid action with the reaction being approximately proportional only to speed.

Other objects and advantages of the invention will become apparent from the following description taken in conjunction wtih the accompanying drawings which illustrate the invention by way of example.

Figure 2:
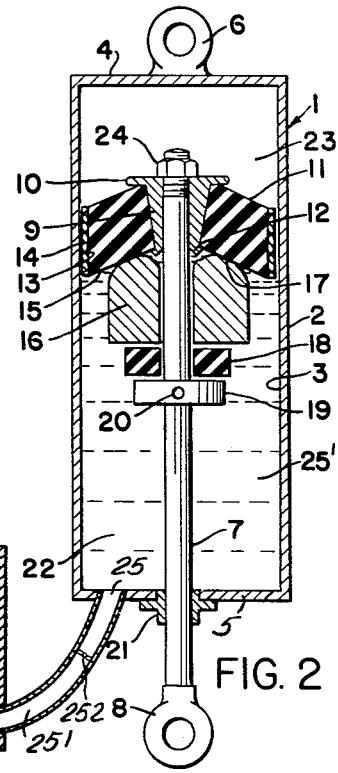
Figure 3:
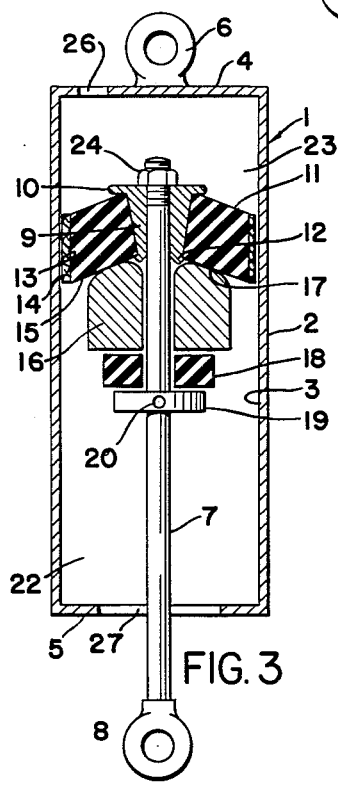
Figure 4:
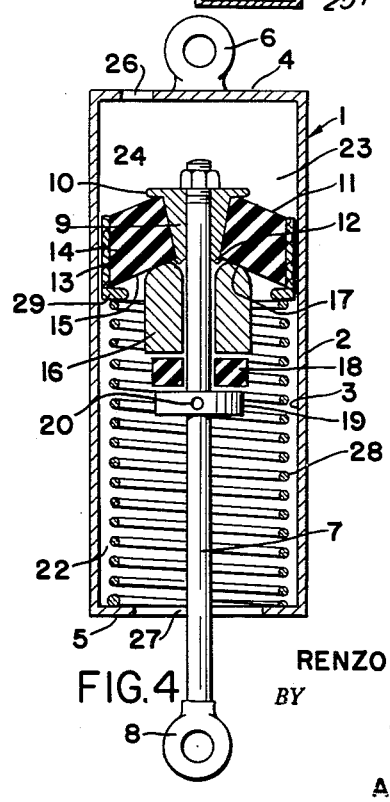
Figure 5:
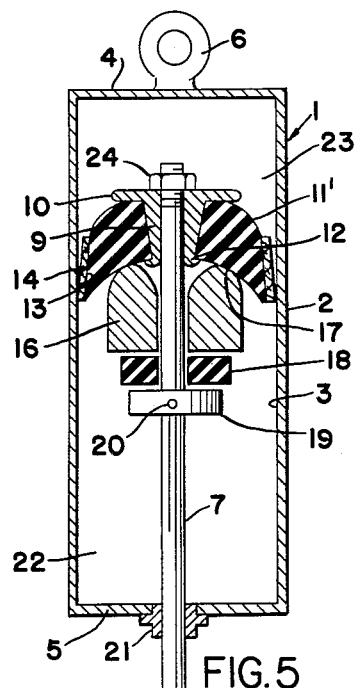
Figure 6:
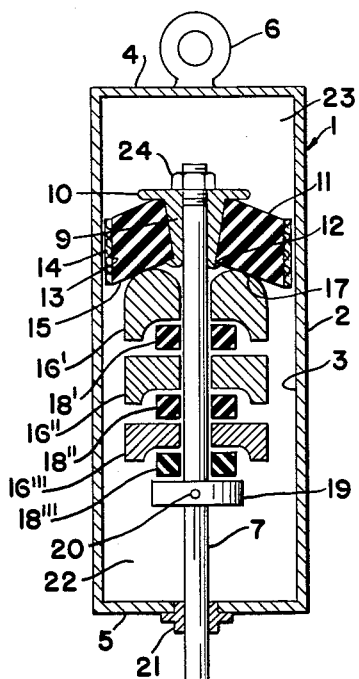
Figure 7:
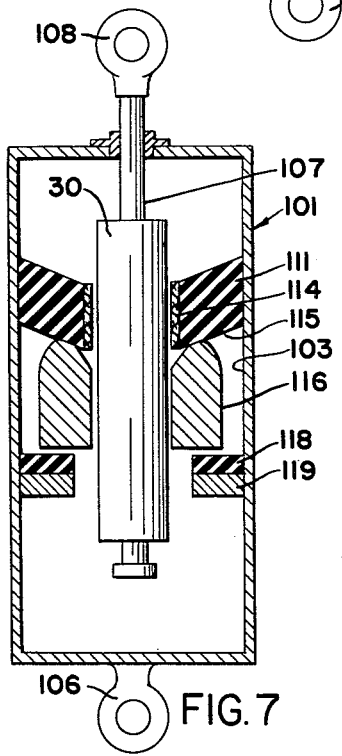
Figure 8:
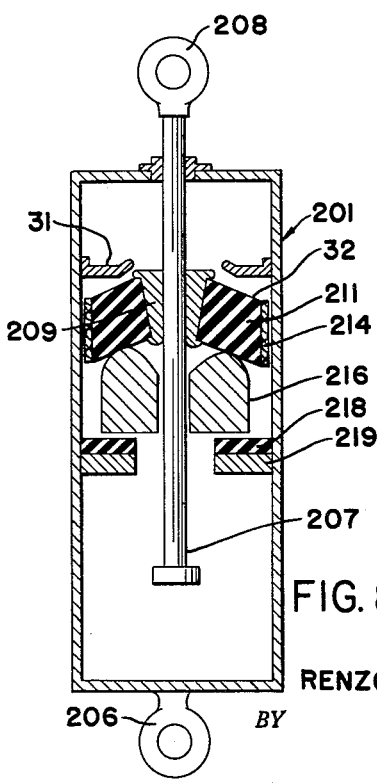
Figure 9:
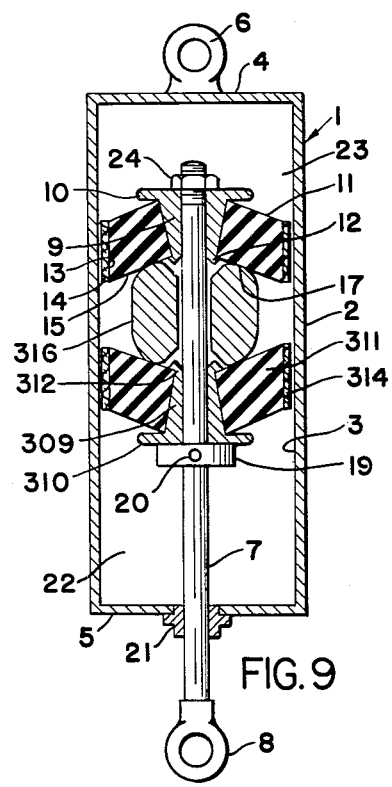
Figure 10A:
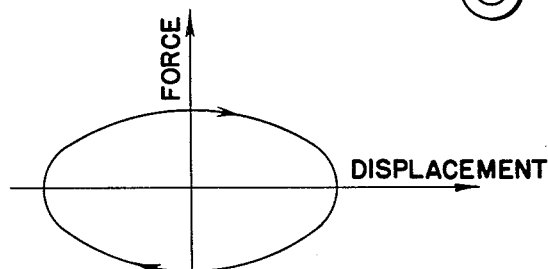
Figure 10C:
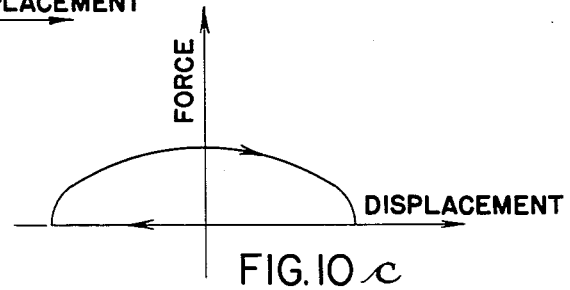
Figure 10B:
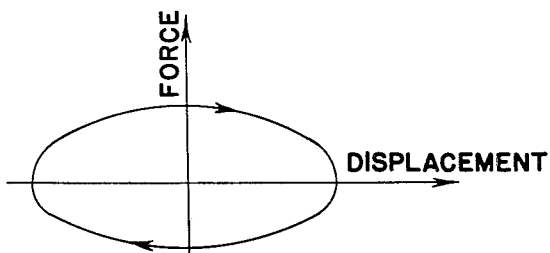

In the drawings:

Fig. 1 shows, in longitudinal section, one form of the shock absorber which is the subject of the present invention, Fig. 2 shows, also in longitudinal section, a modified form of the construction shown in Fig. 1, Fig. 3 shows, also in longitudinal section, another modified form of the construction shown in Fig. 1, Figs. 4 and 5 show two further modifications of the shock absorber, also in longitudinal section, with Fig. 5 showing the elastic element deformed during the working of the shock absorber, Fig. 6 shows a longitudinal section of a further modified shock absorber in which the inert mass or member is of varying sizes, Fig. 7 shows, in longitudinal section, a shock absorber equivalent to that in Fig. 1 as far as the operation is concerned, but wherein the fixed and movable members of the kinematic coupling are reversed, Fig. 8 shows, in longitudinal section, a modification of the construction shown in Fig. 7, Fig. 9 shows, in longitudinal section, a shock absorber similar to that in Fig. 1, but operable with double action, and Figs. 10a, 10b and 10c show some examples of the curve of the friction force in function of displacement, obtainable with the shock absorbers disclosed herein.

Referring particularly to Fig. 1, the numeral 1 indicates, as a whole, the relatively fixed member of the kinematic coupling, comprising a metal tube 2 having a smooth internal surface 3, and equipped with top and bottom covers 4 and 5 suitably connected rigidly to the tube 2 (as by welding or otherwise, after the parts that go into the tube are placed therein), so as to provide a cylinder which is adapted to be connected to one of the suspension parts (e. g. the chassis of a motor vehicle) by means of the eye 6 carried by the cover 4.

Within this cylinder the relatively movable member of the coupling is slidable and comprises a rod 7 connected to another part of the suspension (e. g. the axle of a motor vehicle) by means of the eye 8 carried on the outer end of this rod. Mounted on the inner end of rod 7 is a downwardly tapering sleeve 9 provided with an enlarged flange 10 on its upper end. A deformable elastic element 11 is secured to sleeve 9 between the upper flange 10 and a lower flange 12, and the upper surface of element 11 may be formed flat or otherwise. In this instance, the elastic element 11 preferably consists of an annular conventionally vulcanized rubber body, the outer peripheral wall 13 of which may be parallel with the cylinder wall, as shown, or slightly conical or slightly convex, or otherwise suitably profiled. Wall 13 preferably may have attached thereto, as by vulcanization or other suitable means, a covering material 14 having a high coefficient of friction, but having a resistance to wear and tear greater than that of rubber. A suitable covering material for this purpose is the conventional brake lining material, or any other suitable material which will stretch or expand the relatively small amount required to engage the cylinder wall. In some instances it may be desirable to form the covering 14 in sectors so that it will be discontinuous. Also, in this instance, the lower surface 15 of the elastic element preferably tapers upwardly, as shown, so as to be substantially parallel with the tapered upper surface of element 11, but the latter element may also be bell shaped or dished or otherwise suitably shaped so that it may be deformed in a manner to be described.

Slidable on the rod 7 below the elastic element 11 is an inert mass or member 16 formed of metal or other suitable material, which will be termed an annular inertia member, the upper surface 17 of which is suitably shaped to act efficiently on the lower surface 15 of element 11. Below element 16, rod 7 carries a rubber cushioning ring 18, while below the latter ring a metal collar 19 is secured to rod 7 by means of a screw 20 or the like. The upper end of rod 7 is threaded to receive a nut 24 which may be tightened against sleeve 9 to draw the parts 11, 16 and 18 more or less together, thus obtaining any desirable initial deformation of the elastic element 11, by the action of the inertia member 16 engaging element 11 and deforming it so that its cover is moved toward the wall of the cylinder. From this initial position of the parts, if rod 7 is suddenly displaced downwardly, the elastic element 11 would tend to move downwardly also, but the inertia member 16 would tend to remain momentarily in its position and by contact with elastic element 11 would deform the latter into engagement with the cylinder wall. Any increase in the amount of displacement of rod 7 would result in further deformation of element 11. Now, if rod 7 is displaced upwardly, the inertia member 16 would no longer deform the element 11 beyond its initial deformation, element 11 would then become free of engagement with the cylinder wall, and would permit free upward movement of rod 7.

The cylinder 1 is filled with air or other aeriform fluid, which during the downward displacement of rod 7 is more or less compressed, acting in consequence on the elastic element 11 and deforming it, thus adding its action to that of the inertia member 16. The lower chamber 22 of the cylinder 1 is kept air tight by means of a stuffing box 21 carried by the bottom cover 5 and surrounding rod 7, while the upper chamber 23 is kept air tight by using an imperforate top cover 4, as well as by pressure which the elastic element 11 exerts on the cylinder wall.

The modified form of the invention shown in Fig. 2 differs from that shown in Fig. 1 in that the fluid, instead of being aeriform, consists of a liquid 25' such as an oil of suitable type which does not corrode rubber, which fills the lower chamber 22 of the cylinder 1. Passage of the liquid to and from chamber 22 is obtained through port 25, and by varying the size of this port, the discharge speed of the liquid may be varied upon downward displacement of rod 7, and thus the action of the liquid in deforming the elastic element 11 may also be varied. The liquid which passes through port 25 to and from chamber 22, passes through channel 251 and valve 252, from and to chamber 253.

In the modification shown in Fig. 3, the top cover 4 is provided with a relatively wide opening 26 and the bottom cover 5 is provided with a similar opening 27, which permit the free passage of air during movement of rod 7, thus eliminating the action of any air on elastic element 11. In the device of Fig. 3, only the inertia member 16 acts on the elastic element 11 to deform same.

In the modification shown in Fig. 4, the action of the inertia member 16 on the elastic member 11 is supplemented by the action of a helical metal spring 28 arranged between the bottom cover 5 of the cylinder 1 and the elastic element 11, against which the spring acts to deform the element 11 through a metal ring 29 arranged below element 11. The spring is compressed during downward movement of rod 7 and exerts a force against element 11 to deform same which is directly proportional to the amount of displacement. Except for the supplemental action of spring 28, the shock absorber of Fig. 4 operates similarly to that in Fig. 3. Rubber or other suitable material can be substituted for the metal in the spring.

Fig. 5 shows a modification wherein the elastic element 11' is specially shaped (a slightly convex lateral surface) to provide a dished or bell shaped arrangement which more readily permits use of the stopping action per se to deform the elastic element. This stopping action, which is similar to the well known expansion of brake shoes, serves to increase the braking action of the elastic element 11' against the cylinder wall during downward movement of rod 7, and because of this special shape of element 11', the latter will assume the deformed profile shown in Fig. 5. This stopping action per se becomes particularly important when the forces exerted by the other means referred to are too small by themselves to sufficiently deform the elastic element.

In Fig. 6 a further modification is shown wherein the inertia mass acting on elastic element 11 to deform same is differently shaped and is divided into three parts consisting of inertia members 16', 16'' and 16''', separated by rubber cushioning rings 18' and 18'', while a third ring 18''' is located between inertia member 16''' and collar 19. Inertia member 16' is the largest of the three, member 16'' is next largest and member 16''' is the smallest. With this arrangement, under the action of inertia forces corresponding to low values of acceleration, only the largest inertia member 16' will initially act on the elastic element 11 to deform same, while the other inertia members 16'' and 16''' initially act only on the rubber rings 18' and 18'', causing actions of no importance; only successively, when forces acting have reached determined higher values, will said inertia members 16'' and 16''' act on the inertia member 16', and with the latter will act on the elastic element 11, to deform same.

Fig. 7 shows a modified shock absorber, the action of which is equivalent to that of the shock absorber in Fig. 1, but it differs from the latter in that the relatively fixed and movable members of the kinematic coupling are reversed. That is, the rod 107 is supposed to be relatively fixed through eye 108 and the cylinder 101 to be movable through connections with eye 106. In this arrangement the deformable elastic element 111 is rigidly connected, for example by vulcanization, to the inner wall 103 of the cylinder 101 and carries material 114 on its inner periphery similar to the material 14 previously described. The rod 107 has an enlarged body portion 30 against which the elastic element 111 is deformed by the inertia member 116 (similar to member 16) when the cylinder 101 is displaced downwardly. The enlarged portion 30 of rod 107 serves to increase the friction surface against which the element 111 is deformed without making the rod excessively heavy. In this modification the rubber ring 118 and the metal ring 119 (corresponding generally to rings 18 and 19) are both rigidly secured to the inner wall of cylinder 101. Also, the lower surface 115 of the elastic element 111 is oppositely sloped from the similar surface 15 shown in the previous embodiments, and the inertia member 116 acts on the inner portion of element 111, i. e. the part away from the cylinder.

Fig. 8 is a further modification in which the cylinder 201 is again the movable element of the coupling through connections with eye 206, and rod 207 is the relatively fixed member through eye 208. In this embodiment the deformable elastic member 211 is not secured to either the cylinder 201 or the rod 207, but is secured to a sleeve 209, similar to sleeve 9, which is slidable on rod 207. Rings 218 and 219, similar to rings 118 and 119, are rigidly secured to the inner wall of cylinder 201, and elastic element 211 has material 214, similar to material 14, covering its outer periphery, while an inertia member 216, corresponding to member 16 is interposed between ring 218 and the elastic element 211. Above the elastic element 211, a suitably shaped metal ring 31 is rigidly secured to the inner wall of cylinder 201. With this arrangement, during downward displacement of the cylinder 201, the elastic element 211 is deformed against the cylinder wall by the action of inertia member 216, and in order to increase the lateral deformation of the elastic element, the ring 31 acts against the upper surface 32 of element 211, which surface is sloped similarly to the upper surface of elastic element 11. However, the presence of ring 31 is not essential for regular working of the shock absorber.

The shock absorbers previously described are all of single effect, i. e., the deformable elastic element does not exert any pressure on the relatively fixed member of the kinematic coupling when the movable member of the coupling is moving in one direction, while it does exert such pressure during motion in the opposite direction, sufficient to carry out a shock absorbing or braking action. It is, however, possible to construct a shock absorber according to the present invention having double effect, i. e. with shock absorbing or braking action being exerted in both directions.

Fig. 9 shows such a double acting shock absorber. In this figure the parts identified by the numerals 1 to 15, inclusive, 17, and 19 to 24, inclusive, are identical with the similar parts shown in Fig. 1, and to these parts have been added on rod 7, a second deformable elastic element 311 similar to element 11, but in reverse arrangement with respect to the latter. Element 311 has a peripheral cover 314, similar to cover 14, and is mounted on a sleeve 309, similar to sleeve 9, between flanges 310 and 312, similar to flanges 10 and 12. Between the elastic elements 11 and 311 an inertia member 316 (whose function is similar to that of member 16) is slidable on rod 7, and it will be apparent that this inertia member will deform one of the elastic elements when motion occurs in one direction, and the other elastic element when motion occurs in the opposite direction.

It is evident that with the herein mentioned constructional variations as well as by varying the inertia mass or member, the ports of fluid discharge, viscosity of the fluid, tension of the springs, hardness and shape of the elastic element, and the absolute and relative volume of the cylinder chambers, it is possible to modify within wide limits the shock absorbing or braking action of shock absorbers made according to this invention. In applying a harmonious motion to the shock absorber, a friction-displacement curve may be executed which is either a symmetrical cycle with regard to the middle point of the stroke, as indicated in Fig. 10a, or an asymmetrical cycle, i. e. with a given curve in the forward stroke and a different curve in the return stroke, as indicated in Fig. 10b, or a particular cycle, where the force assumes determined values when motion is occurring in one direction, and no value when it is occurring in the opposite direction, as indicated in Fig. 10c. The curves of Fig. 10a and 10b correspond to shock absorbers having double action, while that in Fig. 10c corresponds to a shock absorber with single action.

The foregoing description and drawings serve only by way of example, as it is evident that modifications of the invention may be made without departing from the spirit of the invention, and within the scope of the subjoined claims. For instance, in lieu of the covering material 14 for the elastic element, fibers of amianthus or asbestos may be incorporated into the rubber or simply into its peripheral area. Or the material 14 may be omitted so that the rubber itself will then directly contact the inner wall of the cylinder. Also, the elastic element in Figs. 1 to 6, 8 and 9 may be vulcanized or otherwise suitably secured to its retaining sleeve.

What is claimed is:

1. A shock absorber for vehicles and the like comprising, a pair of relatively movable members, a deformable elastic element carried by one of said members and adapted to be deformed into frictional engagement with the other of said members, said element initially being out of engagement with the said other of said members, and inertia means movably carried by said one of said members and operable by inertia forces upon relative movement of said members to engage and deform said element into frictional engagement with the said other of said members.

2. A shock absorber of the character referred to in claim 1 wherein the deformation of said elastic element is supplemented by the action of a fluid contained in one of said relatively movable members.

3. A shock absorber of the character referred to in claim 1 wherein the deformation of said elastic element is supplemented by the action of an aeriform fluid contained in one of said relatively movable members.

4. A shock absorber of the character referred to in claim 1 wherein the deformation of said elastic element is supplemented by the action of a spring between the elastic element and the other of said members.

5. A shock absorber of the character referred to in claim 1 wherein said inertia means comprises a plurality of inertia members of progressively diminishing values.

6. A shock absorber for vehicles and the like comprising, a pair of relatively movable members consisting of a cylinder member and a rod member slidable in said cylinder member, a deformable elastic element carried by one of said members and adapted to be deformed into frictional engagement with the other of said members, said element initially being out of engagement with the said other of said members, and inertia means movably carried by said one of said members and operable by inertia forces upon relative movement of said members to engage and deform said element into frictional engagement with the said other of said members.

7. A shock absorber for vehicles and the like comprising, a pair of relatively movable members consisting of a cylinder member and a rod member slidable in said cylinder member, a deformable elastic element carried by said rod member and adapted to be deformed into frictional engagement with the wall of said cylinder member, said element initially being out of engagement with the wall of said cylinder member, and inertia means movably carried by said rod member and operable solely by inertia forces upon relative movement of said rod member to engage and deform said element into frictional engagement with the wall of said cylinder member.

8. A shock absorber for vehicles and the like comprising, a pair of relatively movable members consisting of a cylinder member and a rod member slidable in said cylinder member, a deformable elastic element carried by said cylinder member and adapted to be deformed into frictional engagement with said rod member, said element initially being out of engagement with said rod member, and inertia means movably carried by said cylinder member and operable solely by inertia forces upon relative movement of said cylinder member to engage and deform said element into frictional engagement with said rod member.

9. A shock absorber of the character referred to in claim 7 wherein the deformation of said elastic element is supplemented by the action of a fluid within the cylinder member.

10. A shock absorber of the character referred to in claim 7 wherein the deformation of said elastic member is supplemented by the action of an aeriform fluid within the cylinder member.

11. A shock absorber of the character referred to in claim 7 wherein the deformation of said elastic element is supplemented by the action of a spring within the cylinder member engaging said elastic element.

12. A shock absorber of the character referred to in claim 7 wherein said inertia means comprises a plurality of inertia members of progressively diminishing values.

13. A shock absorber for vehicles and the like comprising, a pair of relatively movable members, a deformable elastic element fixed on one of said members and adapted to be deformed into frictional engagement with the other of said members, said element initially being out of engagement with the said other of said members, and movable inertia means carried by said one of said members and operable by inertia forces upon relative movement of said members to engage and deform said element into frictional engagement with the said other of said members.

14. A shock absorber for vehicles and the like comprising, a pair of relatively movable members consisting of a cylinder member and a rod member slidable in said cylinder member, a deformable elastic element carried by one of said members and adapted to be deformed into frictional engagement with the other of said members, said element initially being out of engagement with the said other of said members, and inertia means carried by said rod member and slidable on said rod member and operable by inertia forces upon relative movement of said cylinder member and rod member to engage and deform said element into frictional engagement with the said other of said members.

15. A shock absorber for vehicles and the like comprising, a pair of relatively movable members consisting of a cylinder member and a rod member slidable in said cylinder member, a deformable elastic element fixed on said rod member against relative longitudinal movement with respect to said rod member and adapted to be deformed into frictional engagement with the wall of said cylinder member, said element initially being out of engagement with the wall of said cylinder member, and an inertia member relatively slidable on said rod member and operable solely by inertia forces upon relative movement of said rod member to engage and deform said element into frictional engagement with the wall of said cylinder member.

16. A shock absorber for vehicles and the like comprising, a pair of relatively movable members consisting of a cylinder member and a rod member slidable in said cylinder member, a deformable elastic element fixed on said rod member against relative longitudinal movement with respect to said rod member and adapted to be deformed into frictional engagement with the wall of said cylinder member, said element initially being out of engagement with the wall of said cylinder member, said elastic element being of rubber-like material and having a surface tapering inwardly toward said rod, and an inertia member relatively slidable on said rod member and operable by inertia forces upon relative movement of said rod member to engage said tapering surface of said elastic element to deform said element into frictional engagement with the wall of said cylinder member.

17. A shock absorber for vehicles and the like comprising, a cylinder member and a rod member relatively slidable in said cylinder member, a rubber-like elastic element fixed on and adjacent the inner end of said rod member and deformable in a generally radial direction into frictional engagement with the wall of said cylinder member, said elastic element having a surface tapering inwardly toward said rod and initially being out of engagement with the wall of said cylinder member, an inertia member in engagement with said tapering surface of said elastic element and relatively slidable on said rod member, and means limiting relative sliding movement of said inertia member in a direction away from said elastic member, the arrangement being such that said inertia member is operable by inertia forces upon relative movement of said rod member to deform said elastic element into frictional engagement with the wall of said cylinder member.

18. A shock absorber for vehicles and the like comprising, a pair of relatively movable members, a pair of deformable elastic elements carried in oppositely disposed positions by one of said members and adapted to be deformed into frictional engagement with the other of said members, said elements initially being out of engagement with the said other of said members, and inertia means movably carried by said one of said members between said elastic elements and operable by inertia forces upon relative movement of said members in one direction to engage and deform one of said elastic elements into frictional engagement with the said other of said members, and upon relative movement of said members in the opposite direction to engage and deform the other of said elastic elements into frictional engagement with the said other of said members.

19. A shock absorber for vehicles and the like comprising, a pair of relatively movable members consisting of a cylinder member and a rod member slidable in said cylinder member, a pair of deformable elastic elements carried in oppositely disposed positions by said rod member and adapted to be deformed into frictional engagement with the wall of said cylinder member, said elements initially being out of engagement with the wall of said cylinder member, and inertia means movably carried by said rod between said elastic elements and operable by inertia forces upon relative movement of said members in one direction to engage and deform one of said elastic elements into frictional engagement with the wall of said cylinder member, and upon relative movement of said members in the opposite direction to engage and deform the other of said elastic elements into frictional engagement with the wall of said cylinder member.

References Cited in the file of this patent

UNITED STATES PATENTS

| Number | Name | Date |
|---|---|---|
| 1,260,019 | Oliver | Mar. 19, 1918 |
| 2,010,623 | Bugatti | Aug. 6, 1935 |
| 2,088,450 | Tea et al. | July 27, 1937 |
| 2,459,537 | Oberstadt | Jan. 18, 1949 |
| 2,620,180 | Dath | Dec. 2, 1952 |

FOREIGN PATENTS

| Number | Country | Date |
|---|---|---|
| 35,599 | France | Oct. 1, 1929 |
| | (1st addition to No. 642,041) | |
| 869,774 | France | Nov. 17, 1941 |